US012749381B2

(12) United States Patent
Maksymenko et al.

(10) Patent No.: US 12,749,381 B2
(45) Date of Patent: Sep. 29, 2026

(54) ITEM DETECTION POINT OF SALE SYSTEM

(71) Applicant: Toshiba Global Commerce Solutions, Inc., Durham, NC (US)

(72) Inventors: Serhii Maksymenko, Kharkov (UA); Evgeny Shevtsov, Plano, TX (US); Andrei Khaitas, McKinney, TX (US); Dmytro Kalashnikov, Kharkov (UA)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/893,611

(22) Filed: Sep. 23, 2024

(65) Prior Publication Data

US 2026/0087908 A1 Mar. 26, 2026

(51) Int. Cl.
*G07G 1/00* (2006.01)
*G06V 10/26* (2022.01)

(52) U.S. Cl.
CPC .......... *G07G 1/0045* (2013.01); *G06V 10/26* (2022.01)

(58) Field of Classification Search
CPC .......................... G07G 1/0045; G06V 10/26
See application file for complete search history.

(56) References Cited

U.S. PATENT DOCUMENTS

| | | | | |
|---|---|---|---|---|
| 12,437,295 | B2 * | 10/2025 | Migdal | G06Q 20/389 |
| 2012/0320199 | A1 * | 12/2012 | Kundu | G06Q 30/06 340/568.5 |
| 2020/0192608 | A1 * | 6/2020 | Pang | G06F 3/08 |
| 2020/0312101 | A1 * | 10/2020 | Wilson | G06Q 20/208 |
| 2023/0120798 | A1 * | 4/2023 | Palande | G06V 10/25 705/23 |
| 2023/0368625 | A1 * | 11/2023 | Sanil | G07G 3/003 |
| 2025/0278988 | A1 * | 9/2025 | Savvides | G06V 10/94 |

* cited by examiner

*Primary Examiner* — Sonji N Johnson
(74) *Attorney, Agent, or Firm* — Kaufman & Canoles P.C.

(57) ABSTRACT

Systems and methods of performing item detection at point of sale are provided. In one exemplary embodiment, a method is performed by a POS system device having a terminal station apparatus and a bagging station apparatus. The terminal station apparatus includes an optical scanner. The bagging station apparatus includes a bagging area. Further, the POS system device is operationally coupled to an optical sensor device having a field of view that includes a region about the POS system device with the POS region having a set of POS subregions. The method includes applying an artificial intelligence model to a set of interacted object track characteristics to enable a determination that one of a set of detected objects is transferred to the POS subregion associated with the bagging area without being scanned.

20 Claims, 8 Drawing Sheets

ITEM DETECTION POINT OF SALE SYSTEM

BACKGROUND

Retailers use point of sale (POS) hardware and software systems to streamline checkout operations and to allow retailers to process sales, handle payments, and store transactions for later retrieval. Each POS system generally includes a number of components including a POS terminal station and a POS bagging station. POS bagging stations can enable customers or retail staff to bag purchased retail items in shopping bags during checkout at the POS systems. POS terminal station devices can include a computer, a monitor, a cash drawer, a receipt printer, a customer display, a barcode scanner, or a debit/credit card reader. POS systems can also include a conveyor belt, a checkout divider, a weight scale, an integrated credit card processing system, a signature capture device, or a customer pinpad device. While POS systems may include a keyboard and mouse, more and more POS systems include monitors with touch-screen technology. Further, the software integrated with POS systems can be configured to handle a myriad of customer-based functions such as product scans, sales, returns, exchanges, layaways, gift cards, gift registries, customer loyalty programs, promotions, and discounts. In a retail environment, there can be multiple POS systems in communication with a server over a network.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
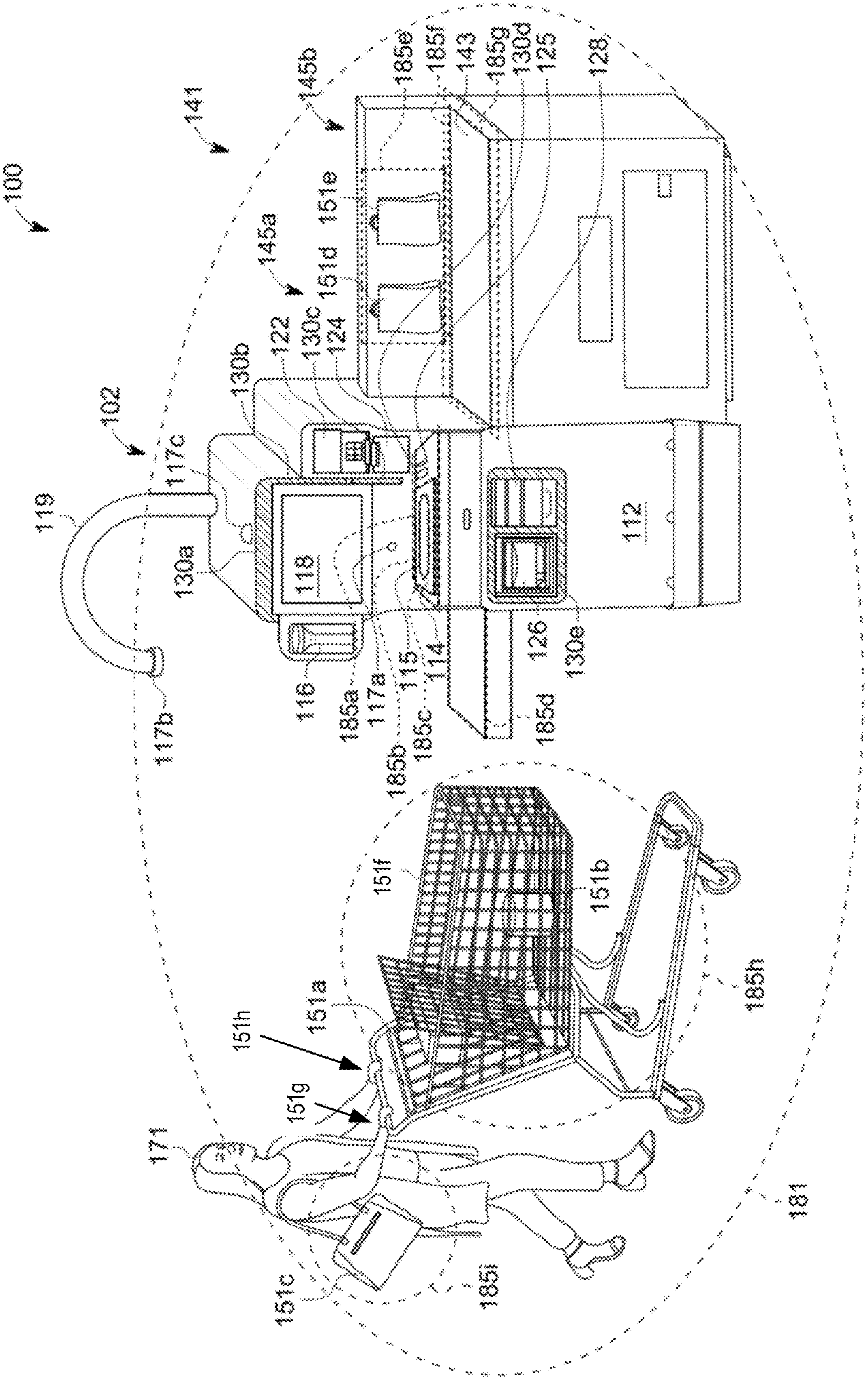
FIG. 1 illustrates one embodiment of a POS system operable to perform item detection in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

A self-checkout station can utilize weight-based item security to ensure consumers place scanned items in a shopping cart or bag. Further, a computer vision system can capture video of activities associated with a self-checkout station and can analyze consumer interaction and behavior based on the captured video. In addition, certain models and algorithms can be integrated at different stages in the processing of the captured video. These models and algorithms can extract useful information from the captured video and can process the captured video to represent various stages of consumer interaction with the self-checkout terminal. For instance, a computer vision system can be utilized to detect a consumer placing scanned or weighed items in a bagging area. The computer vision system can also detect unscanned or unweighed items being transferred to a bagging area and in response, can generate an alert to indicate a possible fraudulent activity. As such, a computer vision system can be configured to evaluate certain behavior of consumers at a self-checkout station to improve detection of non-fraudulent and possible fraudulent activities by consumers.

In this disclosure, embodiments described herein can include the use of a computer vision system to track a target object (e.g., retail item, hand, purse, smartphone, cart, basket, plastic bag) from a certain starting point (e.g., cart, basket) to a certain ending point (e.g., bagging area) about a POS system (e.g., self-checkout station), checkout station) and can include tracking the trajectory of the target object. When the track of the target object about the POS system is completed, processing circuitry of the POS system or the computer vision system can evaluate, based on heuristics, a set of rules or criteria to validate that the track of the target object corresponds to a "cart to bag" scenario where an object is transferred from a cart or basket to a bagging area of the POS system without being scanned. If the evaluation indicates a "cart to bag" scenario, then the target object is identified as being transferred to the bagging area without being scanned. The rules or criteria to identify that a target object is transferred to the bagging area without being scanned can include: the target object is scanned more than once by the POS system; the target object is scanned by a portable scanning device of the POS system; the target object entered less than two POS subregions (e.g., bagging area, container area, scanning platform, scanning window, scanning platform) in a region about the POS system; the target object performed less than two steps in the POS subregions; a maximum distance between the target object track and the subregion associated with the bagging area is less than a certain distance threshold; the ending POS subregion of the target object track is not the POS subregion associated with the bagging area; the starting POS subregion of the target object track is the POS subregion associated with the bagging area; a duration from the target object starting in any POS subregion to entering the subregion associated with the bagging area is less than a certain duration threshold; the target object track corresponds to the POS subregion associated with the scanning window; an area of the target object displayed in each successive image is less than a certain area threshold associated with an object having a certain minimum size; a duration in which the target object is at least a certain minimum area is at least a certain duration threshold; the like; or any combination thereof.

In another exemplary embodiment, when the track of the target object about the POS system is completed, the processing circuitry of the POS system or the computer vision system can generate statistics associated with the track of the target object, extract features from those statistics, and apply a machine learning model to the extracted features to obtain a probability that the target object is transferred from the shopping cart to the bagging area without being scanned. The statistics associated with the track of the target object and the resulting extracted features are related to objects detected in a region about the POS system and POS subregions in the POS region such as a POS subregion associated with a container (e.g., shopping cart, shopping bag, shopping basket), a POS subregion associated with the scanning window, and/or a POS subregion associated with the bagging area.

FIG. 1 illustrates one embodiment of a POS system 100 operable to perform item detection at point of sale in accordance with various aspects as described herein. As shown in FIG. 1, the POS system 100 (e.g., checkout station device, self-checkout station device) can be communicatively coupled to a network node (e.g., server) over a network (e.g., Ethernet, WiFi, Internet). The POS system 100 can include a terminal station device 102 and a bagging station device 141. The terminal station device 102 can include a housing 112, a scan platform 114 having a scanner window 115 through which an optical scanner device disposed under the scanner window 115 can scan a visual object identifier code (e.g., barcode, QR code) disposed on an object 151*a,b* (e.g., retail item) while on, above or about the scanner window 115, another optical scanner 116 (e.g., portable or handheld scanner), a display device 118 (e.g., touchscreen), a payment processing mechanism 122 (e.g., credit card transaction device), a printer 124, a coupon slot mechanism 125, a cash acceptor mechanism 126, a change (e.g., coins, cash) interface mechanism 128, the like, or any combination thereof. In addition, the terminal station device 102 can be configured to include a set of light emitting element (LED) devices 130*a-e* (collectively, LED devices 130). The housing 112 can be configured to include a cabinet that contains a processing circuitry operable to control the operations and functions of the POS system 100. Each LED device 130*a-e* can be configured to be individually or collectively controlled by a processing circuit of the POS system 100 to indicate certain contextual information to a consumer or a retail store clerk. Although not explicitly shown herein, the housing 112 can also contain cabling and other functional components that communicatively couple the POS system 100 to a network (e.g., Ethernet, WiFi, Internet) or a network node (e.g., server) over the network or that communicatively couple the terminal station device 102 to the bagging station device 141. The bagging station device 141 can include a bagging area 143 associated with a load sensor device operable to measure a weight of any object placed in the bagging area 143.

In FIG. 1, each scanner device 115, 116 can be configured as an optical scanner device operable to scan a visual object identifier code (e.g., barcode, QR code) disposed on an object 151*a,b* (e.g., retail item) that a consumer intends to purchase via the POS system 100. The scanner device 116 can be configured as a hand-held, battery-operated scanner that a consumer or a clerk can remove from its battery charging dock to scan barcodes on retail items such as without having to remove them from a shopping cart. Each visual object identifier code can represent one of a set of object identifiers (e.g., UPCs), with each identifier being specific to a certain object (e.g., retail item, trade item) and represented by a series of characters (e.g., numeric characters, alphabetic characters, alphanumeric characters). Universal Product Code (UPC), which can refer to UPC-A, consists of a sequence of twelve characters (e.g., 12 numeric characters) that are uniquely assigned to each object. Along with the related International Article Number (EAN) barcode, the UPC is the barcode mainly used for scanning retail items at the point of sale, per the specifications of the international GS1 organization. In one example, a UPC-A barcode consists of a sequence of twelve characters (e.g., 12 digits), which are made up of four sections: a number system character, a five-character manufacturing number, a five-character item number and a check character.

In FIG. 1, the scanner device 115 can include the scanner window 114 and can be operable to perform dual scanner and weight scale functions to allow the retail item to be contemporaneously scanned and weighed for purchase by a consumer. The scan platform 114 can be configured to allow an object to be placed on the scan platform 114 to enable the object to be weighed by the weight scale function. The display 118 can be operable to display information associated with retail items being purchased by a consumer. The payment processing mechanism 122 can be configured with a pinpad device operable to accept a non-cash payment vehicle (e.g., credit card or debit card), while the printer 124 can be configured to print receipts or coupons. The coupon slot mechanism 125 can include a generally elongated slot configured to receive coupons being redeemed by a consumer. The cash acceptor mechanism 126 can be operable to receive cash (e.g., paper money, coins) from the consumer for the retail items being purchased by the consumer. The change interface mechanism 128 can be operable to provide change to the consumer in the form of paper money or coins.

Furthermore, the terminal station device 102 can also include optical sensor devices 117*a-c* (e.g., camera). Each optical sensor device 117*a-c* can be operable to capture an image of at least a portion of the POS system 100, capture an image about the POS system 100 that includes a POS region 181, capture an image of the environment surrounding the POS system 100, capture an image of one or more surfaces of the POS system 100 such as the scan platform 114 or the bagging area 183, or the like. The optical sensor device 117*a* can have a field of view that includes the scan platform 114, the scan window 115, the environment before the POS system 100, or the like. The optical sensor device 117*b* can have a field of view that includes the POS system 100, the POS region 181 about the POS system 100, the environment about the POS system 100, or the like. While the optical sensor device 117*b* is shown in FIG. 1 at the end of an extension mechanism 119 (e.g., extension pole) of the POS system 100 that extends the optical sensor device 117*b* above the POS system 100, in other embodiments, the optical sensor device 117*b* can be disposed on a ceiling surface above the POS system 100, positioned on the POS system 100, or the like. The optical sensor device 117*c* can be operable to capture the environment about the POS system 100 such as to detect a consumer entering or exiting the POS region 181.

In one exemplary operation of the POS system 100 of FIG. 1, the POS system 100 or the optical sensor device 117*a-c* can obtain data that represents a set of successive images of the POS region 181 captured by the optical sensor (e.g., camera) of the optical sensor device 117*a-c* as the object 151*a-e* is moved in the POS region 181 such as a hand 151*g,h* of a consumer 171 grabbing the object 151*a,b* and removing it from a container 151*f* (e.g., cart, basket, bag) and placing it in the bagging area 143. The processing circuitry of the POS system 100 can receive from the optical sensor device 117*a-c* the successive image data associated with the POS region 181. Additionally or alternatively, the optical sensor device 117*a-c* can receive from the optical sensor the successive image data associated with the POS region 181. The successive image data can include display of the POS region 181 including the POS system 100, the consumer 171 and the container 151*f* (e.g., cart, basket, bag) proximate the POS system 100. The POS region 181 can include a set of POS subregions 185*a-i*. The set of POS subregions 185*a-i* can include: a POS subregion 185*a* associated with an extended area about the scanning platform 114 such as to include objects that when placed on the scanning platform 141 can extend outside the scanning platform 141; a POS subregion 185*b* disposed in the POS subregion 185*a* and associated with the scanning platform 114; a POS subregion 185*c* disposed in the POS regions 185*a,b* and associated with the scanning window 115; a POS subregion 185*d* associated with a shelf of the POS system 100, which can be used to place a container (e.g., basket, bag) while objects disposed in the container are scanned; a POS subregion 185*e* associated with a bag holder 145*a,b* having bags 151*d, e* for use by the consumer 171 during self-checkout to bag an object 151*a,b*; a POS subregion 185*f* associated with an extended area about the bagging area 143 such as to include objects that when placed in the bagging area 143 can extend outside the bagging area 143, a POS subregion 185*g* associated with the bagging area 143; a POS subregion 185*h* associated with the container 151*f*; a POS region 185*i* associated with a personal object 153 (e.g., clothes, hat, purse, handbag, wallet, eyewear, phone, laptop, shopping bag, coffee, soda, return item) carried or worn by the consumer 171; the like, or any combination thereof. The objects 151*a,b* disposed in the container 151*f* can include a visual object identifier code (e.g., barcode, QR code) disposed on that object 151*a,b* (e.g., retail item), with each visual object identifier code being configured to be scanned by the a scanner device to obtain an object identifier.

Furthermore, the POS system 100 or the optical sensor device 117*a-c* can apply pre-processing to the data of each successive image. For instance, the POS system 100 or the optical sensor device 117*a-c* can apply to the data of each successive image a filter to reduce image artifacts or noise; convert color pixels to grayscale pixels; orient the POS region 181 to the same orientation; crop a perimeter of the POS region 181; change image resolution; enhance image quality; the like; or any combination thereof. Further, the POS system 100 or the optical sensor device 117*a-c* can determine a perimeter of the POS region 181 based on the successive image data. In addition, the POS system 100 or the optical sensor device 117*a-c* can determine a perimeter for any or all of the POS subregions 185*a-i*. For instance, the POS system 100 can define, for each successive image, the POS region 181 or any POS subregion 185*a-i* based on the successive image data. The POS system 100 or the optical sensor device 117*a-c* can determine, for each successive image, a location of an object 151*a-h* in the POS region 181 based on the successive image data. The POS system 100 or the optical sensor device 117*a-c* can detect activity in one of the set of POS subregions 185*a-i* based on the successive image data. The POS system 100 or the optical sensor device 117*a-c* can then determine that the activity in the detected POS subregion 185*a-i* corresponds to the object 151*a-h* in that POS subregion 185*a-i*. Further, the POS system 100 or the optical sensor device 117*a-c* can identify the object 151*a-h* as starting an object movement track in the identified POS subregion 185*a-i*. The object movement track can include a set of successive locations of the object 151*a-h* as it is moved in the POS region 181 based on the successive image data, with each successive location being related to a corresponding successive image. In one example, the POS system 100 or the optical sensor device 117*a-c* can determine that the detected activity in the POS subregion 185*h* corresponds to the object 151*a* (e.g., retail item) disposed in the container 151*f* (e.g., shopping cart) being removed from that container 151*f*. In another example, the POS system 100 or the optical sensor device 117*a-c* can determine that the detected activity in the POS subregion 185*i* corresponds to the object 153 (e.g., purse) being removed from the shoulder of the consumer 171. In another example, the POS system 100 or the optical sensor device 117*a-c* can determine that the detected activity in the POS subregion 185*c* corresponds to an object 151*d,e* (e.g., plastic bag) being removed from its corresponding shopping bag holder 145*a,b*.

Moreover, the POS system 100 or the optical sensor device 117*a-c* can determine the object movement track having a set of successive object locations of the object 151*a-h* as the object 151*a-h* is moved in the POS region 181 based on the successive image data. The POS system 100 or the optical sensor device 117*a-c* can identify those POS subregions 185*a-i* that correspond to the object movement track of the object 151*a-h* based on the successive image data and the object movement track. Further, the POS system 100 or the optical sensor device 117*a-c* can identify the target object 151*a-h* as starting or ending the object movement track in at least one of the set of POS subregions 185*a-i*. The POS system 100 or the optical sensor device 117*a-c* can determine a duration between the starting and ending POS subregions 185*a-i* that correspond to the object movement track of the object 151*a-h* based on the successive image data or the object movement track. The POS system 100 or the optical sensor device 117*a-c* can also determine a chronological order of the identified POS subregions 185*a-i* based on the successive image data or the object movement track. In addition, the POS system 100 or the optical sensor device 117*a-c* can determine that the object 151*a-h* is transferred to the POS subregion 185*f,g* associated with the bagging area 143 without being scanned based on a set of criteria associated with the set of POS subregions 185*a-i* or the object movement track. The set of criteria can include: a first criteria associated with a determination that the object 151*a-h* is transferred to the POS subregion 185*f,g* associated with the bagging area 143 without being scanned based on the number of POS subregions 185*a-i* that correspond to the object movement track; a second criteria associated with a determination that the object 151*a-h* is transferred to the POS subregion 185*f,g* associated with the bagging area 143 without being scanned based on whether the POS subregion 185*c* associated with the scanning window 115 corresponds to the object movement track; a third criteria associated with a determination that the object 151*a-e* is transferred to the POS subregion 185*f,g* associated with the bagging area 143 without being scanned based on a starting or ending POS subregion 185*a-i* that corresponds to the object movement track; a fourth criteria associated with a determination that the object 151*a-e* is transferred to the POS subregion 185*f,g* associated with the bagging area 143 without being scanned based on a set of distances between the set of successive locations of the object movement track and that POS subregion 185*f,g*; a fifth criteria associated with a determination that the object 151*a-e* is transferred to the POS subregion 185*f,g* associated with the bagging area 143 without being scanned based on a set of distances between the set of successive locations of the object movement track and that POS subregion 185*f,g* and on the duration between the starting and ending POS subregions 185*a-i* of the object 151*a-e* that correspond to the object movement track; the like; or any combination thereof.

In another embodiment, the POS system 100 or the optical sensor device 117*a-c* can detect that the same object 151*a,b* is scanned more than one time by the optical scanning device based on the successive image data or the object movement track. The set of criteria can further include another criteria associated with a determination that the object 151*a,b* is transferred to the POS subregion 185*f,g* associated with the bagging area 143 without being scanned responsive to a determination that the same object 151*a,b* is scanned more than once by the optical scanning device.

In another embodiment, the POS system 100 or the optical sensor device 117*a-c* can determine that the object 151*a-b* is scanned by the portable scanning device 116 based on the successive image data or the object movement track. The set of criteria can further include another criteria associated with a determination that the object 151*a,b* is transferred to the POS subregion 185*f,g* associated with the bagging area 143 without being scanned responsive to the determination that the object 151*a,b* is scanned by the portable scanning device 116.

In another exemplary operation of the POS system 100 of FIG. 1, the POS system 100 or the optical sensor device 117*a-c* can obtain data that represents the set of successive images of the POS region 181 captured by the optical sensor 117*a-c* (e.g., camera) when an object 151*a-e* is interacted with in the POS region 181 such as by a hand 151*f,g* of a consumer 171 grabbing the object 151*a,b*, removing it from the container 151*f* (e.g., cart, basket, bag), and then transferring the object 151*a,b* to the bagging area 143. The processing circuitry of the POS system 100 can receive from the optical sensor device 117*a-c* the successive image data associated with the POS region 181. Additionally or alternatively, the optical sensor device 117*a-c* can receive from the corresponding optical sensor the successive image data associated with the POS region 181. The POS system 100 or the optical sensor device 117*a-c* can detect, classify or identify a set of objects 151*a-h* (e.g., hand, retail item, cart, basket, purse, smartphone, consumer, bag, portable scanner, or the like) displayed in the set of successive images based on the successive image data. The POS system 100 can detect an interacted object 151*a-e* that is interacted with in the POS region 181 as displayed in the set of successive images based on the set of detected objects and the successive image data. The POS system 100 or the optical sensor device 117*a-c* can determine a set of successive image segmentation masks that visually represents segmentation of the interacted object 151*a-e*, the set of detected objects and the set of POS subregions 185*a-i* displayed in the set of successive images based on the successive image data. The POS system 100 or the optical sensor device 117*a-c* can determine a set of detected object characteristics based on the set of successive image segmentation masks. The set of detected object characteristics can include information such as detected object mask area, distance between detected objects 151*a-h* (e.g., distance between retail item and hand of consumer, distance between retail items, distance between retail item and shopping cart), distance between a detected object 151*a-h* and a POS subregion 185*a-i*, the like, or any combination thereof. The POS system 100 or the optical sensor device 117*a-c* can extract, based on the set of detected object characteristics, a set of interacted object track characteristics related to the interaction with the interacted object 151*a-e* in the POS region 181 as displayed in the set of successive images based on the set of detected object characteristics. The set of interacted object track characteristics can be associated with all or a portion of an object movement track of the interacted object 151*a-e* with the object movement track representing a set of successive locations of the interacted object 151*a-e* as the interacted object 151*a-e* is moved in the POS region 181 based on the successive image data. Further, each successive location corresponds to a certain one of the set of successive images.

Furthermore, the set of interacted object track characteristics can include a duration of all or a portion of the object movement track of the interacted object 151*a-e*; a distance between the interacted object 151*a-e* and another detected object 151*a-h*; a distance between the interacted object 151*a-e* and a POS subregion 185*a-i*; a distance between the interacted object 151*a-e* and an object 151*g,f* (e.g., hand) that interacts with the interacted object 151*a-e*; a distance between the interacted object 151*a-e* and a container 151*f*; an average intersection over the POS subregion 185*f,g* associated with the bagging area 143; an average distance the interacted object 151*a-e* moved per each successive image; a maximum distance the interacted object 151*a-e* is moved during the interaction with the interacted object 151*a-e*; a distance between the interacted object 151*a-e* and the POS subregion 185*f,g* associated with the bagging area 143 on an initial successive image for which the interacted object 151*a-e* is detected; a distance between the interacted object 151*a-e* and the POS subregion 185*f,g* associated with the bagging area 143 on a final successive image for which the interacted object 151*a-e* is detected; a percentage of the set of successive images (e.g., starts from an initial successive image for which the interacted object 151*a-e* is detected and ends at a final successive image for which the interacted object 151*a-e* is detected) for which the interacted object 151*a-e* is detected in the POS subregion 185*f,g* associated with the bagging area 143; a percentage of the set of successive images (e.g., starts from an initial successive image for which the interacted object 151*a-e* is detected and ends at a final successive image for which the interacted object 151*a-e* is detected) for which the interacted object 151*a-e* is detected in the POS subregion 185*a-c* associated with the scanning platform 115; a percentage of the set of successive images (e.g., starts from an initial successive image for which the interacted object 151*a-e* is detected and ends at a final successive image for which the interacted object 151*a-e* is detected) for which the interacted object 151*a-e* is not detected in any POS subregion 185*a-i*; a percentage of the set of successive images (e.g., starts from an initial successive image for which the interacted object 151*a-e* is detected and ends at a final successive image for which the interacted object 151*a-e* is detected) for which the interacted object 151*a-e* is simultaneously detected in at least two POS subregions 185*a-c*, 185*f-g*; a percentage of the set of successive images (e.g., starts from an initial successive image for which the interacted object 151*a-e* is detected and ends at a final successive image for which the interacted object 151*a-e* is detected) for which the object 151*f,g* is undetected in the POS region 181; a percentage of the set of successive images (e.g., starts from an initial successive image for which the interacted object 151*a-e* is detected and ends at a final successive image for which the interacted object 151*a-e* is detected) for which the interacted object 151*a-e* is the only object of the set of objects 151*a-h* that is detected in the POS region 181; a percentage of the set of successive images (e.g., starts from an initial successive image for which the interacted object 151*a-e* is detected and ends at a final successive image for which the interacted object 151*a-e* is detected) for which the container 151*f* is detected in the POS region 181; a percentage of the set of successive images (e.g., starts from an initial successive image for which the interacted object 151*a-e* is detected and ends at a final successive image for which the interacted object 151*a-e* is detected) for which the interacted object 151*a,b* has been indicated as being scanned by the POS system 100; a minimum, maximum or average size of a mask area of the interacted object 151*a,b* in the set of successive images; the like; or any combination thereof. The set of interacted object track characteristics can include interacted object track characteristics that are determined over the entirety of the object movement track of the interacted object 151*a-e* or a certain portion of the object movement track of the interacted object 151*a-e*, a beginning portion (e.g., initial second(s)) of the object movement track of the interacted object 151*a-e*, an ending portion (e.g., last second(s)) of the object movement track of the interacted object 151*a-e*, the like, or any combination thereof. For instance, the set of interacted object track characteristics can include one or more interacted object track characteristics associated with the entirety of the object movement track of the interacted object 151*a-e*, one or more interacted object track characteristics associated with a portion of the object movement track of the interacted object 151*a-e* that corresponds to the bagging area 143, and one or more interacted object track characteristics associated with the last second(s) of the object movement track of the interacted object 151*a-e*.

The distance between the interacted object 151*a-e* and another detected object 151*a-h* can be further classified or indicated as follows: only the interacted object 151*a-e* was detected during the interaction with the interacted object 151*a-e*; another object 151*a-h* is detected during the interaction with the interacted object 151*a-e* and the other object 151*a-h* is considered distant (e.g., minimum or average distance between the interacted object 151*a-e* and the other object 151*a-h* is greater than a certain distance such as 100 pixels); another object 151*a-h* is detected during the interaction with the interacted object 151*a-e* but the other object 151*a-h* is considered a moderate distance (e.g., average distance between the interacted object 151*a-e* and the other object 151*a-h* is a certain distance range such as 50 to 100 pixels); another object 151*a-h* is detected during the interaction with the interacted object 151*a-e* and the other object 151*a-h* is considered proximate (e.g., average distance between the interacted object 151*a-e* and the other object 151*a-h* is less than a certain distance such as 50 pixels); the like; or any combination thereof.

The distance between the interacted object 151*a-e* and the detected object associated with a hand 151*g,h* can be further classified as follows: the object 151*g,h* was not detected during any interaction with the interacted object 151*a-e*; the object 151*g,h* is detected during the interaction with the interacted object 151*a-e* and the object 151*g,h* is considered distant (e.g., minimum or average distance between the interacted object 151*a-e* and the object 151*g,h* is greater than a certain distance such as 100 pixels); the object 151*g,h* is detected during the interaction with the interacted object 151*a-e* but the object 151*g,h* is considered a moderate distance (e.g., average distance between the interacted object 151*a-e* and the object 151*g,h* is a certain distance range such as 50 to 100 pixels); the object 151*g,h* is detected during the interaction with the interacted object 151*a-e* and the object 151*g,h* is considered proximate (e.g., average distance between the interacted object 151*a-e* and the object 151*g,h* is less than a certain distance such as 50 pixels); the like; or any combination thereof.

The distance between the interacted object 151*a-e* and the detected object associated with the container 151*f* can be further classified as follows: the object 151*f* was not detected during any interaction with the interacted object 151*a-e*; the object 151*f* is detected during the interaction with the interacted object 151*a-e* and the object 151*f* is considered distant (e.g., minimum or average distance between the interacted object 151*a-e* and the object 151*f* is greater than a certain distance such as 100 pixels); the object 151*f* is detected during the interaction with the interacted object 151*a-e* but the object 151*f* is considered a moderate distance (e.g., average distance between the interacted object 151*a-e* and the object 151*f* is a certain distance range such as 50 to 100 pixels); the object 151*f* is detected during the interaction with the interacted object 151*a-e* and the object 151*f* is considered proximate (e.g., average distance between the interacted object 151*a-e* and the object 151*f* is less than a certain distance such as 50 pixels); the like; or any combination thereof.

In the current embodiment, the POS system 100 or the optical sensor device 117*a-c* can apply an artificial intelligence model (e.g., machine learning circuit, neural network circuit) to the set of interacted object track characteristics to obtain an indication that the interacted object 151*a-e* is transferred to the POS subregion 185*f,g* associated with the bagging area 143 without being scanned and a corresponding confidence level. The artificial intelligence model can correspond to supervised learning algorithms such as linear regression, logistic regression, decision trees, random forest, support vector machines (SVM), k-nearest neighbors (k-NN), naive Bayes, gradient boosting machines (e.g., XGBoost, LightGBM, CatBoost), or the like; unsupervised learning algorithms such as k-means clustering, hierarchical clustering, principal component analysis (PCA), independent component analysis (ICA), Gaussian mixture models (GMM), t-distributed stochastic neighbor embedding (t-SNE), autoencoders, or the like; semi-supervised learning algorithms such as self-training, co-training, label propagation, graph-based semi-supervised learning, or the like; reinforcement learning algorithms such as Q-learning, deep Q-networks (DQN), policy gradient methods (e.g., REINFORCE), proximal policy optimization (PPO), actor-critic algorithms, Monte Carlo tree search (MCTS), or the like; deep learning algorithms such as convolutional neural networks (CNNs), recurrent neural networks (RNNs), long short-term memory (LSTM) networks, generative adversarial networks (GANs), transformers, autoencoders, attention mechanisms, or the like; ensemble learning algorithms such as bagging (e.g., Bootstrap Aggregating), boosting (e.g., AdaBoost, Gradient Boosting), stacking, voting classifier, or the like; the like; or any combination thereof. Further, the artificial intelligence model can be implemented via software, firmware, or circuitry in the POS system 100, the optical sensor device 117*a-c*, a network node operationally coupled to the POS system 100 over a network, the like, or any combination thereof. For an implementation that includes software or firmware, processing of the corresponding portion of the artificial intelligence model can be performed across one or more processing circuits of the POS system 100 or the optical sensor device 117*a-c*. For an implementation that includes circuitry, the processing circuitry of the POS system 100 or the optical sensor device 117*a-c* can interface with the artificial intelligence circuitry. For an implementation where the network node performs the artificial intelligence model, the POS system 100 can communicate with the network node over the network to enable the network node to perform the artificial intelligence model.

Furthermore, the artificial intelligence model can be trained based on a set of predetermined interacted object track characteristics related to an interacted object from an initial detection to a last detection in the POS region 181 that is proximate the POS subregion 185*f,g* associated with the bagging area 143 and without being scanned. The set of predetermined interacted object track characteristics can include the following: a large number of data records (e.g., 100, 1000, 10000, 100000 data records); each record can include a set of predetermined interacted object track characteristics, with the track being represented from initial detection to last detection of that object in the POS region; each record includes aggregated detected object characteristics for at least two successive images; no restrictions on data records based on where the interacted object 151*a-e* is initially detected; data records restricted to those where the interacted object 151*a-e* is last detected proximate the POS subregion 185*f,g* associated with the bagging area 143; the like; or any combination thereof.

The POS system 100 or the optical sensor device 117*a-c* can then determine that the interacted object 151*a-e* is transferred to the POS subregion 185*f,g* associated with the bagging area 143 without being scanned based on the indication and the corresponding confidence level. For instance, the POS system 100 or the optical sensor device 117*a-c* can determine that the interacted object 151*a-e* is transferred to the POS subregion 185*f,g* associated with the bagging area 143 without being scanned if the corresponding confidence level is at least a certain confidence threshold (e.g., 50%, 75%, 80%, 85%, 90%, 95%, 98%, 99%). The POS system 100 or the optical sensor device 117*a-c* can send an indication that the interacted object 151*a-e* is transferred to the POS subregion 185*f,g* associated with the bagging area 143 without being scanned. In one example, the optical sensor device 117*a-c* can send, to the POS system 100, an indication that the interacted object 151*a-e* is transferred to the POS subregion 185*f,g* associated with the bagging area 143 without being scanned. In another example, the POS system 100 can send, to an LED device 130*a-e*, an indication to enable illumination by that LED device 130*a-e* so as to alert a clerk. In yet another example, the POS system can send, to a network node, an indication that the interacted object 151*a-e* is transferred to the POS subregion 185*f,g* associated with the bagging area 143 without being scanned.

Figure 2A:
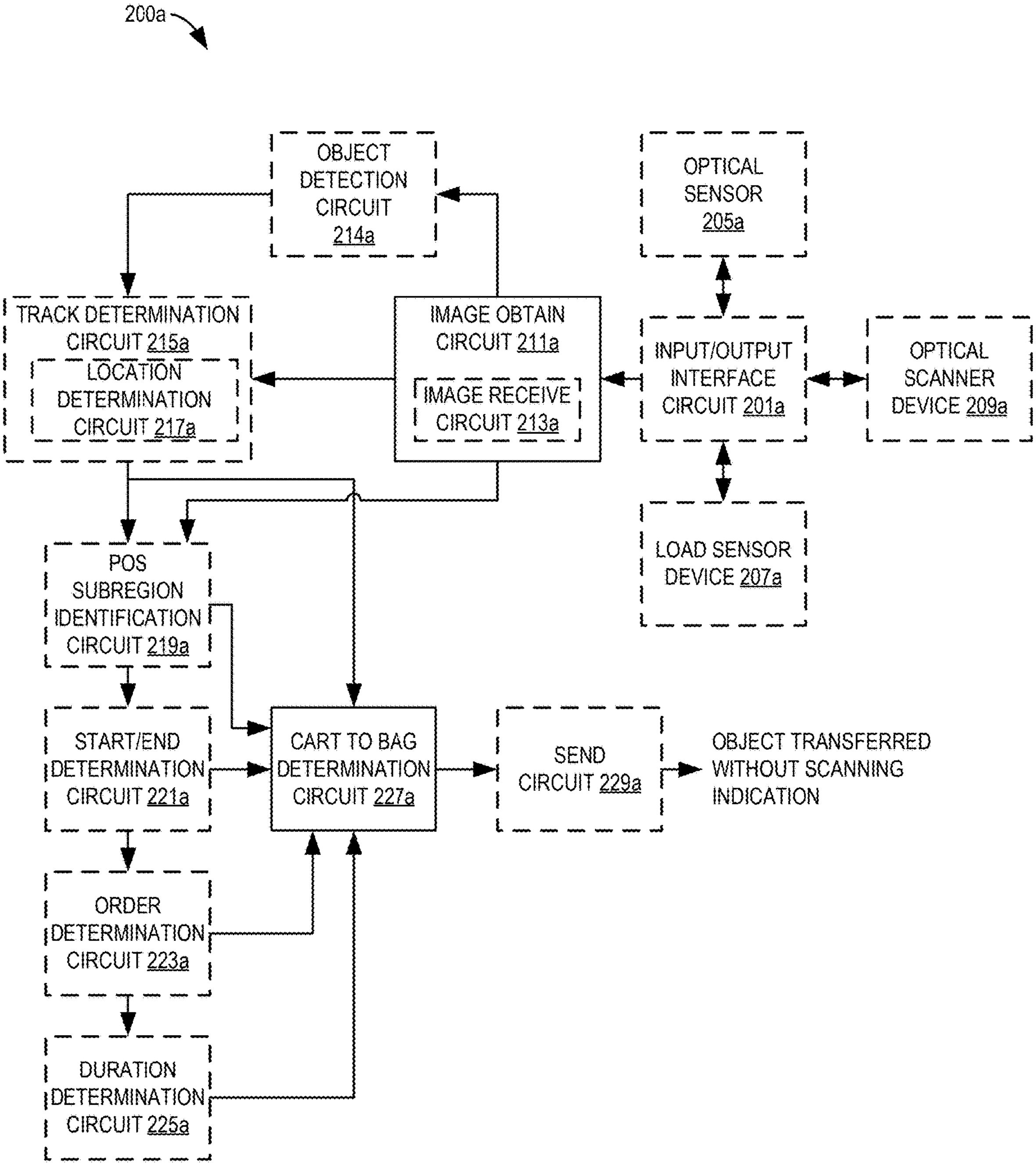
FIGS. 2A and 2B illustrate other embodiments of a POS system device or an optical sensor device in accordance with various aspects as described herein.

FIG. 2A illustrates another embodiment of a POS system device or an optical sensor device 200*a* in accordance with various aspects as described herein. In FIG. 2A, the device 200*a* implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: an input/output interface circuit 201*a* operable to interface with input and output devices such as an optical sensor or optical sensor device 205*a* (e.g., camera), a load sensor device 207*a* (e.g., weight scale), an optical scanner device 209*a* (e.g., camera, scanner), or the like; an image obtain circuit 211*a* operable to obtain image data such as from the optical sensor 205*a* or the optical scanner device 207*a*; an image receive circuit 213*a* operable to receive, from the optical sensor 205*a* or the optical scanner device 207*a*, an indication that includes successive image data; an object detection circuit 214*a* operable to detect an object based on the successive image data; a track determination circuit 215*a* operable to determine an object movement track having a set of successive locations of the target object as the target object is moved in the POS region based on the successive image data; a successive location determination circuit 217*a* operable to determine, for each successive image, one of the set of successive locations of the target object in the POS region based on the successive image data; a POS subregion identification circuit 219*a* operable to identify those POS subregions that corresponds to the object movement track of the target object based on the successive image data or the object movement track; a starting/ending POS subregion determination circuit 221*a* operable to identify a starting or ending POS subregion of the target object based on the successive image data or the object movement track; a POS subregion order determination circuit 223*a* operable to determine a chronological order of the identified POS subregions based on the successive image data or the object movement track; a duration determination circuit 225*a* operable to determine a duration between the starting and ending POS subregions that correspond to the object movement track based on the successive image data or the object movement track; a cart to bag determination circuit 227*a* operable to determine that the target object is transferred to the POS subregion associated with the bagging area without being scanned based on the successive image data or the object movement track; and/or a send circuit 229*a* operable to send information.

Figure 2B:
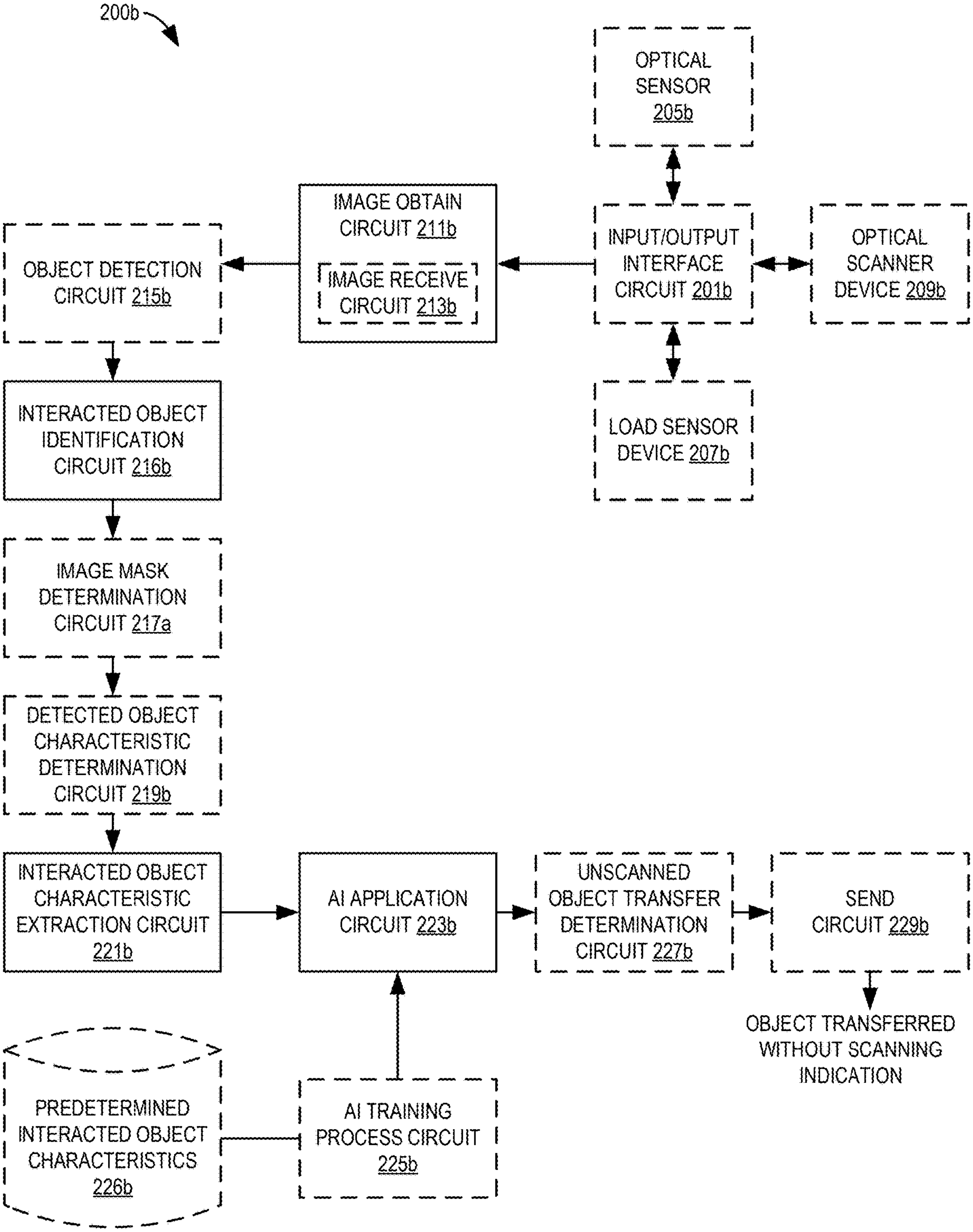

FIG. 2B illustrates another embodiment of a POS system device or an optical sensor device 200*b* in accordance with various aspects as described herein. In FIG. 2B, the device 200*a* implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: an input/output interface circuit 201*b* operable to interface with input and output devices such as an optical sensor or optical sensor device 205*b* (e.g., camera), a load sensor device 207*b* (e.g., weight scale), an optical scanner device 209*b* (e.g., camera, scanner), or the like; an image obtain circuit 211*b* operable to obtain image data such as from the optical sensor 205*b* or the optical scanner device 207*b*; an image receive circuit 213*b* operable to receive, from the optical sensor 205*b* or the optical scanner device 207*b*, an indication that includes successive image data; an object detection circuit 215*b* operable to detect the set of detected objects based on the successive image data; an interacted object identification circuit 216*b* operable to identify the interacted object from the set of identified objects; an image mask determination circuit 217*a* operable to determine a set of successive image segmentation masks that visually represents the segmentation of the set of detected objects and the set of POS subregions in the set of successive images based on the successive image data; a detected object characteristic determination circuit 219*b* operable to determine a set of detected object characteristics based on the set of successive image segmentation masks; an interacted object track characteristic extraction circuit 221*b* operable to extract, based on the set of detected object characteristics, a set of interacted object track characteristics related to the interacted object from initial detection to last detection of that object in the POS region; an artificial intelligence circuit 223*b* operable to apply an artificial intelligence model to the set of interacted object characteristics to obtain an indication that the interacted object is transferred to the POS subregion associated with the bagging area without being scanned and a corresponding confidence level; an artificial intelligence training process circuit 225*b* operable to train the artificial intelligence model based on a set of predetermined interacted object characteristics related to an interacted object from an initial detection to a last detection in the pos region that is proximate the POS subregion associated with the bagging area and without being scanned; an unscanned object transfer determination circuit **227*b* operable to determine that the interacted object is transferred to the POS subregion associated with the bagging area without being scanned based on the indication and the corresponding confidence level; and/or a send circuit 229*b*** operable to send information.

Figure 3:
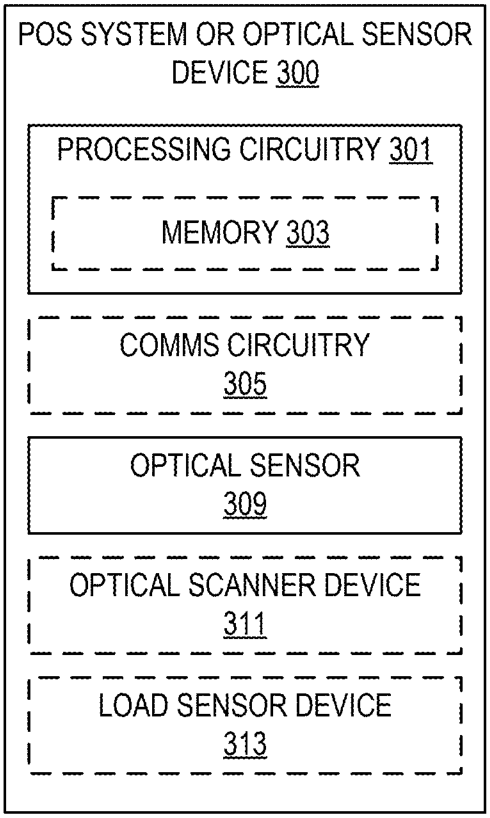
FIG. 3 illustrates another embodiment of a POS system device or an optical sensor device in accordance with various aspects as described herein.

FIG. 3 illustrates another embodiment of a POS system/device or an optical sensor device 300 in accordance with various aspects as described herein. In FIG. 3, the device 300 may include processing circuitry 301 that is operably coupled to one or more of the following: memory 303, network communications circuitry 305, an optical sensor device 309 (e.g., camera), an optical scanner device 311 (e.g., scanner), a load sensor device 313, the like, or any combination thereof. The network communication circuitry 305 is configured to transmit or receive information to or from one or more other devices via any communication technology. The processing circuitry 301 is configured to perform processing described herein, such as by executing instructions stored in memory 303. The processing circuitry 301 in this regard may implement certain functional means, units, or modules. The optical sensor or optical sensor device 309 is operable to capture an image, the optical scanner device 311 is operable to capture a visual object identifier code disposed on an object, and the load sensor device 313 is operable to measure a load of an object.

Figure 4A:
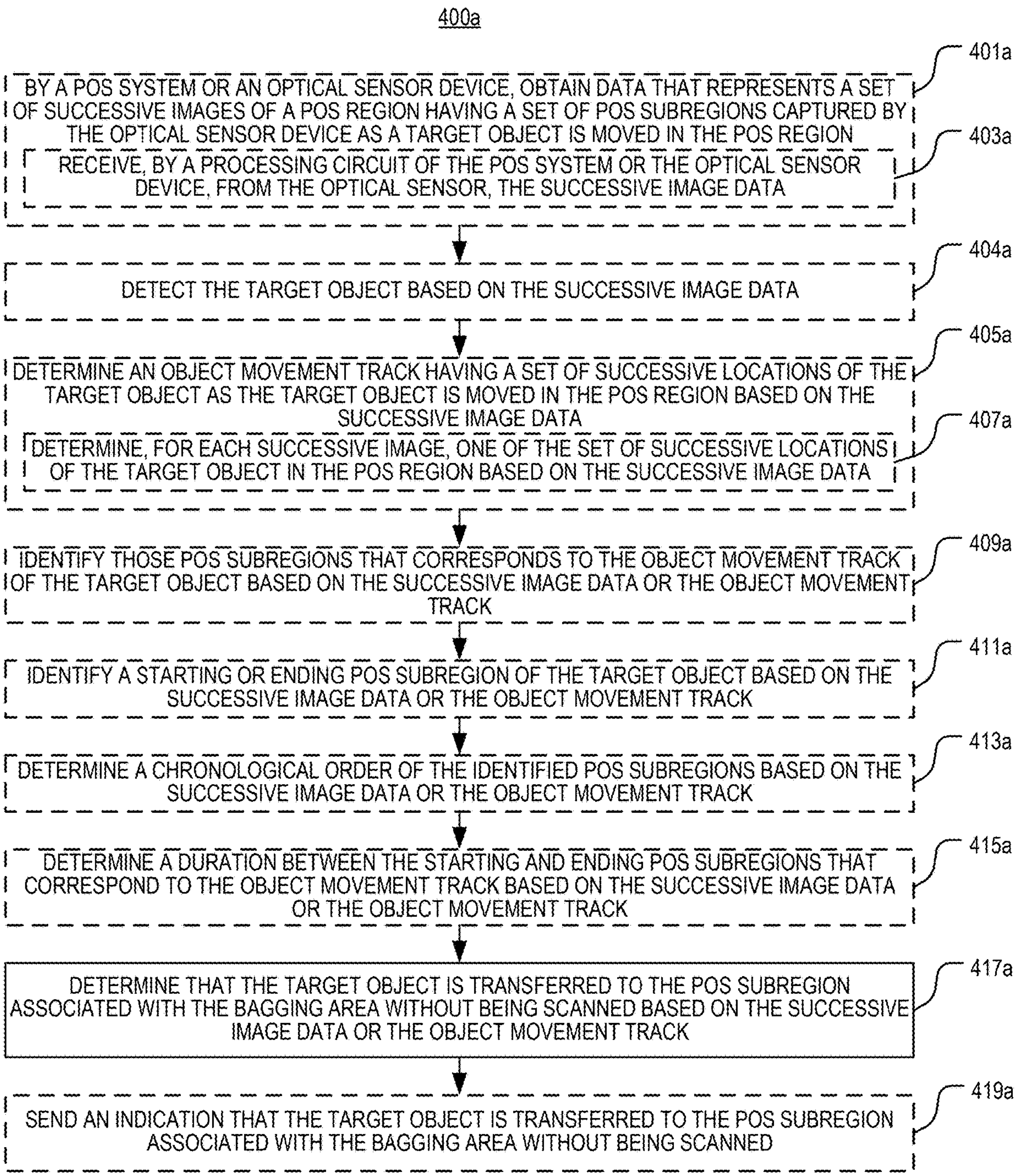
FIGS. 4A-4D illustrate embodiments of a method performed by a POS system device or an optical sensor device of performing item detection in accordance with various aspects as described herein.

FIG. 4A illustrates one embodiment of a method **400*a* performed by the POS system 100, 200, 300, 500 or an optical sensor device 117*b*, 200, 300, 500 of performing item detection at point of sale in accordance with various aspects as described herein. In FIG. 4A, the method 400*a* may start, for instance, at block 401*a* where it may include obtaining data that represents a set of successive images of the POS region captured by the optical sensor as a target object is moved in the POS region. For instance, at block 403*a*, the method 400*a* may include receiving, by a processing circuit of the POS system 100, 200, 300, 500 or the optical sensor device 117*b*, 200, 300, 500 from the optical sensor of the optical sensor device 117*b*, 200, 300, 500 the successive image data. At block 404*a*, the method 400*a* can include detecting the target object based on the successive image data. At block 405*a*, the method 400*a* may include determining the object movement track having the set of successive locations of the target object as the target object is moved in a POS region based on the successive image data. For instance, the method 400*a* may include determining, for each successive image, a location of the target object in the POS region based on the corresponding successive image data, as represented by block 407*a*. At block 409*a*, the method 400*a* may include identifying at least one of the set of POS subregions that corresponds to the object movement track of the target object based on the successive image data or the object movement track. The method 400*a* can also include identifying a starting or ending POS subregion of the target object based on the successive image data or the object movement track, as represented at block 411*a*. At block 413*a*, the method 400*a* can include determining a chronological order of the identified POS subregions based on the successive image data or the object movement track. In addition, at block 415*a*, the method 400*a* can include determining a duration between the starting and ending POS subregions that correspond to the object movement track based on the successive image data or the object movement track. At block 417*a*, the method 400*a* includes determining that the target object is transferred to the POS subregion associated with the bagging area without being scanned based on the successive image data or the object movement track. At block 419*a*, the method 400*a*** can include sending an indication that the target object is transferred to the POS subregion associated with the bagging area without being scanned.

Figure 4B:
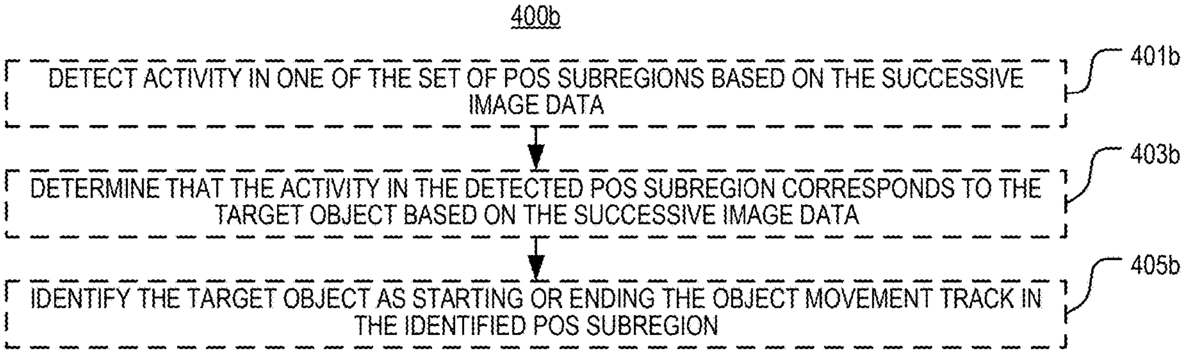

FIG. 4B illustrates another embodiment of a method **400*b* performed by a POS system 100, 200, 300, 500 or an optical sensor device 117*b*, 200, 300, 500 of performing item detection at point of sale in accordance with various aspects as described herein. In FIG. 4B, the method 400*b* may start, for instance, at block 401*b* where it can include detecting activity in one of the set of POS subregions based on the successive image data. At block 403*b*, the method 400*b* can include determining that the activity in the detected POS subregion corresponds to the target object based on the successive image data. At block 405*b*, the method 400*b*** can include identifying the target object as starting or ending the object movement track in the identified POS subregion.

Figure 4C:
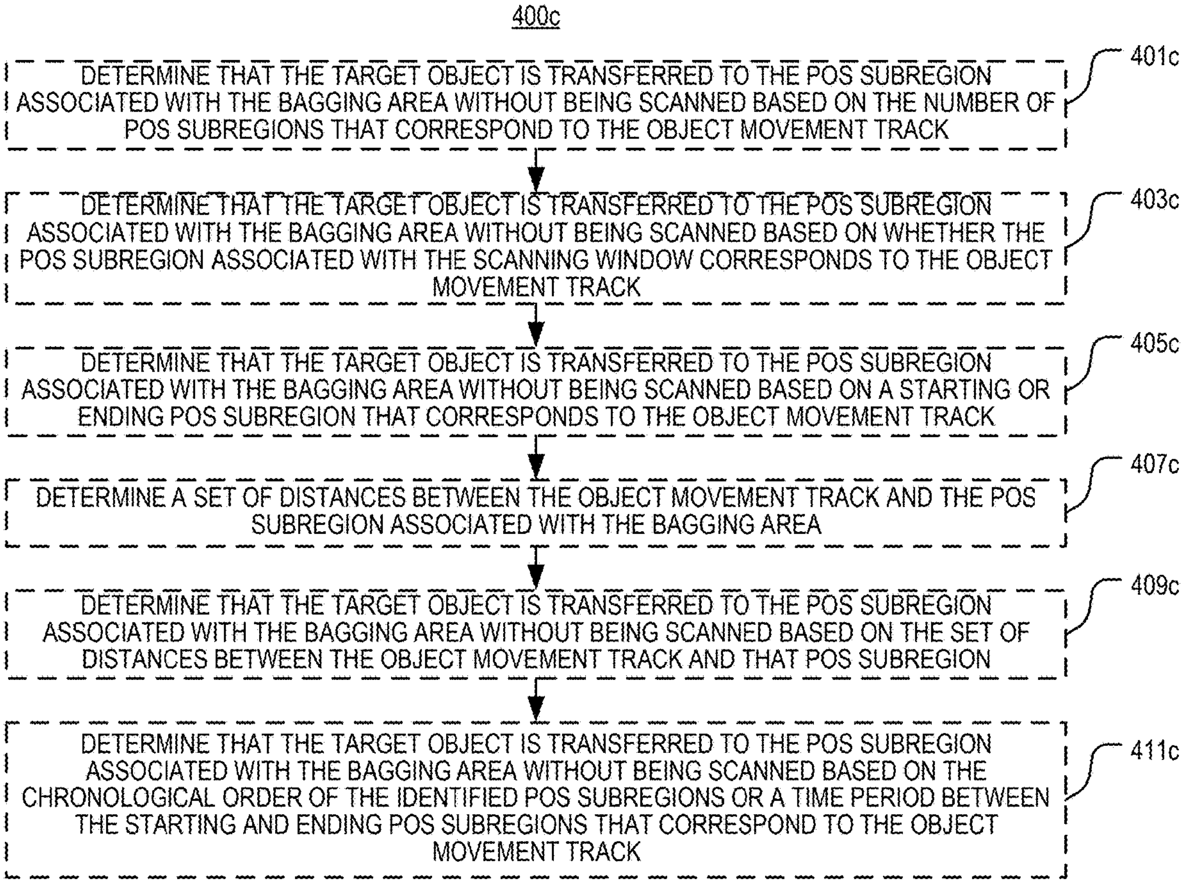

FIG. 4C illustrates another embodiment of a method **400*c* performed by a POS system 100, 200, 300, 500 or an optical sensor device 117*b*, 200, 300, 500 of performing item detection at point of sale in accordance with various aspects as described herein. In FIG. 4C, the method 400*c* may start, for instance, at block 401*c* where it can include determining that the target object is transferred to the POS subregion associated with the bagging area without being scanned based on the number of POS subregions that correspond to the object movement track. At block 403*c*, the method 400*c* can include determining that the target object is transferred to the POS subregion associated with the bagging area without being scanned based on whether the POS subregion associated with the scanning window corresponds to the object movement track. At block 405*c*, the method 400*c* can include determining that the target object is transferred to the POS subregion associated with the bagging area without being scanned based on a starting or ending POS subregion that corresponds to the object movement track. The method 400*c* can include determining a set of distances between the object movement track and the POS subregion associated with the bagging area, as represented by block 407*c*. In addition, at block 409*c*, the method 400*c* can include determining that the target object is transferred to the POS subregion associated with the bagging area without being scanned based on the set of distances between the object movement track and the POS subregion associated with the bagging area. At block 411*c*, the method 400*c*** can include determining that the target object is transferred to the POS subregion associated with the bagging area without being scanned based on the chronological order of the identified POS subregions or a time period between the starting and ending POS subregions that correspond to the object movement track.

Figure 4D:
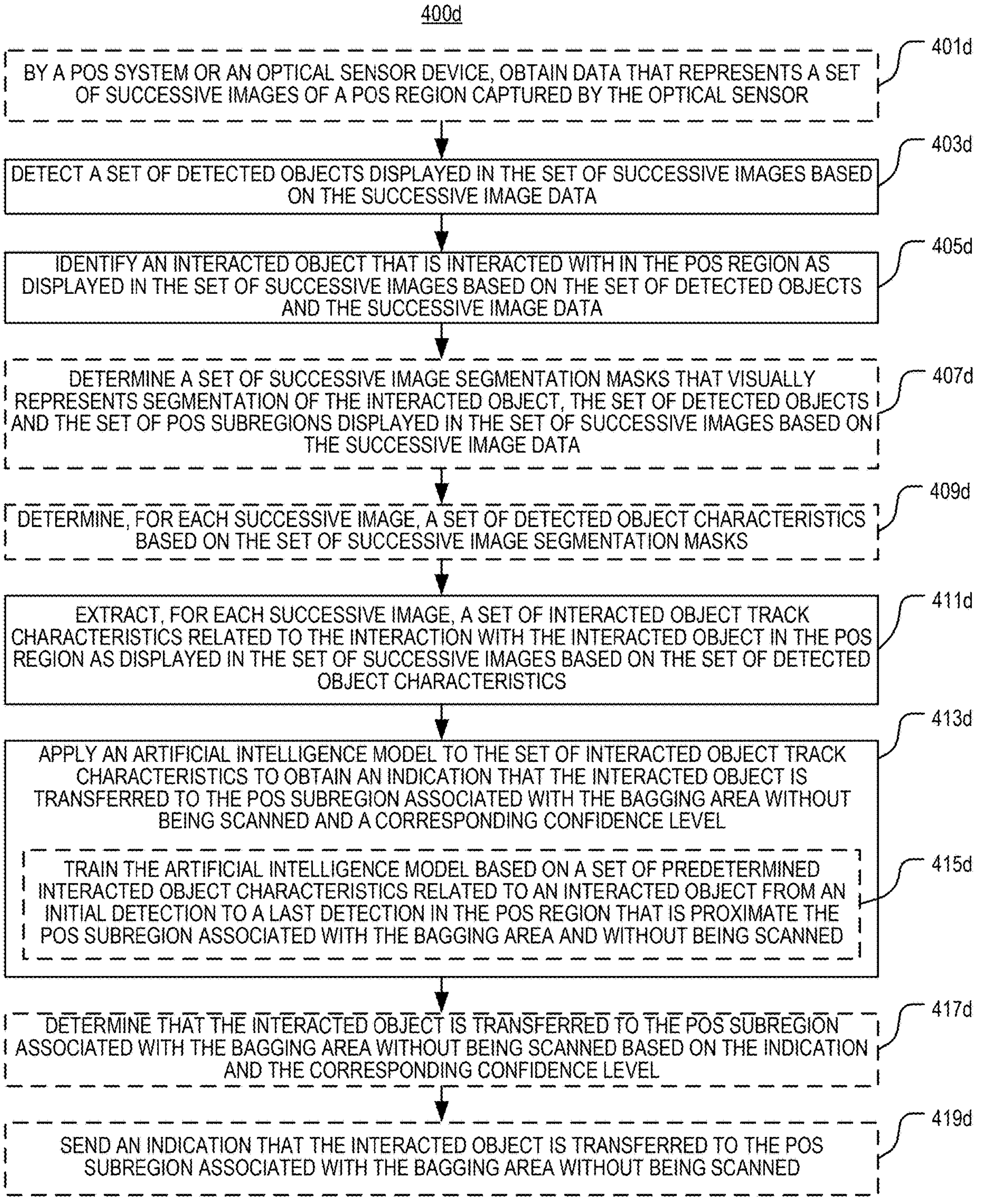

FIG. 4D illustrates one embodiment of a method **400*d* performed by the POS system 100, 200, 300, 500 or an optical sensor device 117*b*, 200, 300, 500 of performing item detection at point of sale in accordance with various aspects as described herein. In FIG. 4D, the method 400*d* may start, for instance, at block 401*d* where it can include obtaining data that represents a set of successive images of a POS region captured by the optical sensor while at least one of a set of detected objects is interacted with in the POS region. For instance, the method 400*d* can include receiving, by a processing circuit of the POS system 100, 200, 300, 500 or the optical sensor device 117*b*, 200, 300, 500 from the optical sensor of the optical sensor device 117*b*, 200, 300, 500 the successive image data. At block 403*d*, the method 400*d* can include detecting a set of detected objects displayed in the set of successive images based on the successive image data. At block 405***d*, the method 400*d* includes identifying at least one of the set of detected objects that is interacted with in the POS region based on the successive image data to obtain an interacted object. At block 407*d*, the method 400*d* can include determining a set of successive image segmentation masks that visually represents segmentation of the set of detected objects and the set of POS subregions displayed in the set of successive images based on the successive image data. At block 409*d*, the method 400*d* can include determining, for each successive image, a set of detected object characteristics based on the set of successive image segmentation masks. At block 411*d*, the method 400*d* includes extracting, for each successive image, based on the set of detected object characteristics, a set of interacted object track characteristics related to the interacted object from initial detection to last detection of that object in the POS region. At block 413*d*, the method 400*d* includes applying an artificial intelligence model to the set of interacted object characteristics to obtain an indication that the interacted object is transferred to the POS subregion associated with the bagging area without being scanned and a corresponding confidence level. At block 415*d*, the method 400*d* can include training the artificial intelligence model based on a set of predetermined interacted object characteristics related to an interacted object from an initial detection to a last detection in the POS region that is proximate the POS subregion associated with the bagging area and/or without being scanned. At block 417*d*, the method 400*d* can include determining that the interacted object is transferred to the POS subregion associated with the bagging area without being scanned based on the indication and the corresponding confidence level. At block 419*d*, the method 400*d* can include sending an indication that the interacted object is transferred to the POS subregion associated with the bagging area without being scanned.

Figure 5:
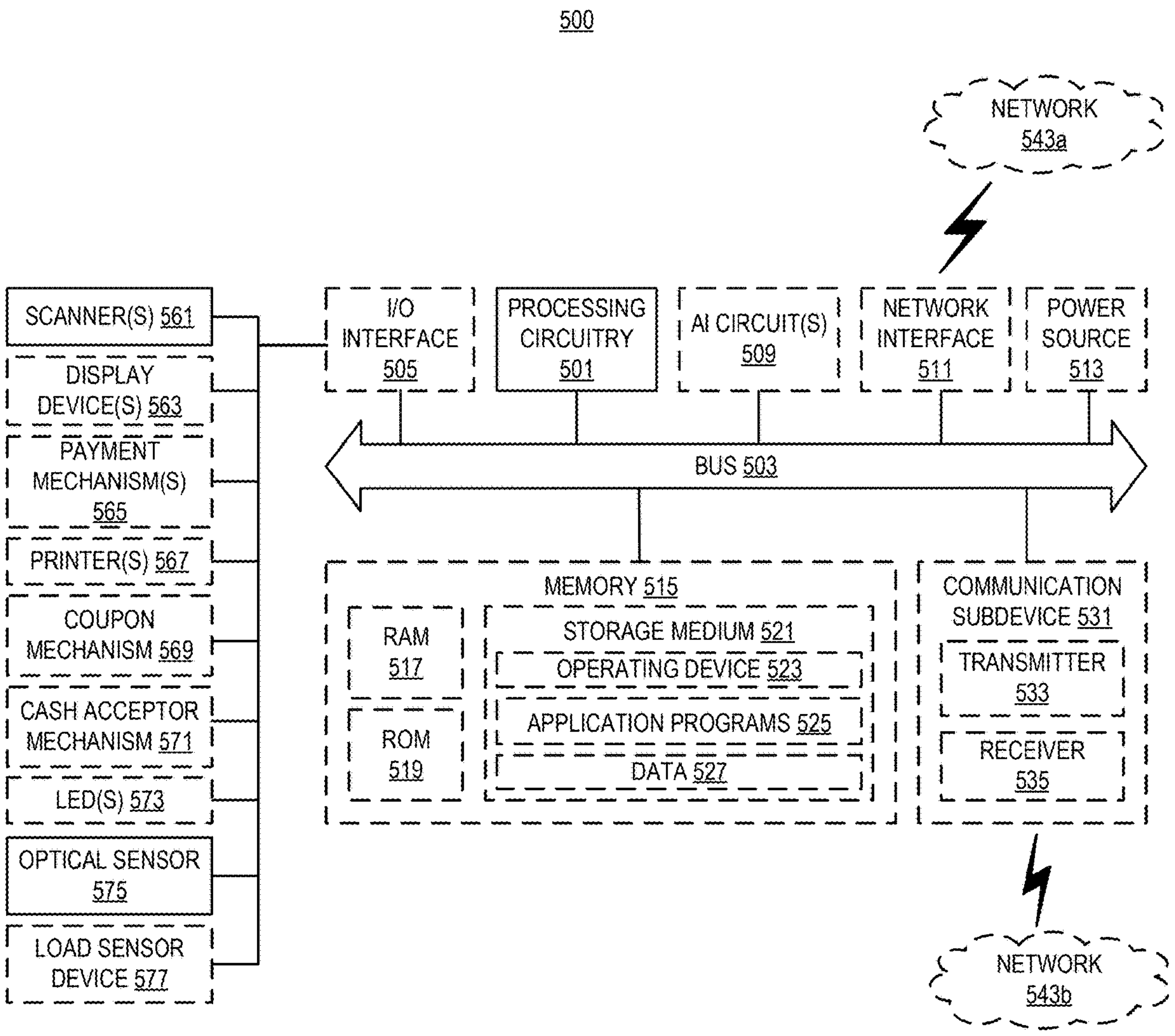
FIG. 5 illustrates another embodiment of a POS system device or an optical sensor device in accordance with various aspects as described herein.

FIG. 5 illustrates another embodiment of a POS system device or an optical sensor device (e.g., camera system) 500 in accordance with various aspects as described herein. In FIG. 5, device 500 includes processing circuitry 501 that is operatively coupled over bus 503 to input/output interface 505, artificial intelligence circuitry 509 (e.g., neural network circuit, machine learning circuit), network connection interface 511, power source 513, memory 515 including random access memory (RAM) 517, read-only memory (ROM) 519 and storage medium 521, communication subsystem 531, and/or any other component, or any combination thereof. In one example, the device 500 can be operatively coupled to one or more optical sensor devices over a wired communication interface (e.g., USB, Ethernet) or wireless communication interface (e.g., WiFi, Bluetooth). Further, the device 500 can be operatively coupled to one or more optical sensor devices via the network connection interface 511 or the communication subsystem 531.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500. The input device may include a scanner 561 (e.g., optical scanner device), a touch-sensitive or presence-sensitive display 563, an optical sensor 575 (e.g., camera), a load sensor (e.g., weight sensor), a microphone, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, a microphone, an ultrasound sensor, another like sensor, or any combination thereof. As shown in FIG. 5, the input/output interface 505 can be configured to provide a communication interface to components of the POS system 100 such as the scanner associated with the scanner window 115, the scanner 116, a scale associated with the scan platform 114, the display device 118, touchscreen 118, the payment processing mechanism 122, the printer 124, the coupon slot mechanism 125, the cash acceptor mechanism 126, light emitting devices 130, keyboard, keypad, card reader, the like, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuitry 509 may be configured to learn to perform tasks by considering examples such as performing detection, classification or identification of objects based on an image. In one example, first artificial intelligence circuitry is configured to perform activity detection. Further, second artificial intelligence circuitry is configured to perform object classification or identification. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Alternatively or additionally, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Additional embodiments will now be described. At least some of these embodiments may be described as applicable in certain contexts for illustrative purposes, but the embodiments are similarly applicable in other contexts not explicitly described.

In one exemplary embodiment, a method is performed by a POS system having a terminal station apparatus and a bagging station apparatus with a bagging area. The terminal station apparatus includes a scanning platform having a scanning window and an optical scanner operable to scan through the scanning window a visual object identifier code disposed on an object while transferred over the scanning window. Further, the POS system is operationally coupled to an optical sensor device having an optical sensor with a field of view that includes a region about the POS system and operable to capture an image that includes the POS region. The POS region includes a set of POS subregions with a first POS subregion associated with a container having one or more objects, a second POS subregion associated with the scanning platform, a third POS subregion disposed in the second POS region and associated with the scanning window, and a fourth POS subregion associated with the bagging area. The method includes obtaining data that represents a set of successive images of the POS region captured by the optical sensor device as a target object is moved in the POS region to enable a determination that the target object is transferred to the fourth POS subregion without being scanned based on a set of criteria associated with the set of POS subregions and an object movement track having a set of successive object locations of the target object as the target object is moved in the POS region. Further, each successive object location is determined based on the corresponding successive image.

In another exemplary embodiment, the image obtaining step can further include receiving, by a processing circuit of the POS system or the optical sensor device, from the optical sensor, the successive image data.

In another exemplary embodiment, the method can further include detecting activity in the first POS subregion based on the successive image data; determining that the activity in the first POS subregion corresponds to the target object disposed in the container based on the successive image data; or identifying the target object as starting the object movement track in the first POS subregion.

In another exemplary embodiment, the method can further include identifying at least one of the set of POS subregions that corresponds to the object movement track of the target object; determining a chronological order of the identified POS subregions; or determining a duration between the starting and ending POS subregions that correspond to the object movement track.

In another exemplary embodiment, the tracked location determining step can further include determining, for the set of successive images, the set of successive object locations of the target object in the POS region based on the successive image data; or determining the object movement track based on the set of successive object locations.

In another exemplary embodiment, the tracked location determination step can further include determining a trajectory of the target object at that location based on the successive image data.

In another exemplary embodiment, the method can further include determining that the target object is transferred to the fourth POS subregion without being scanned based on the set of criteria associated with the set of POS subregions and the object movement track.

In another exemplary embodiment, at least one of the set of criteria is associated with a number of the set of POS subregions that corresponds to the object movement track.

In another exemplary embodiment, at least one of the set of criteria is associated with a starting or ending POS subregion of the set of POS subregions that corresponds to the object movement track.

In another exemplary embodiment, at least one of the set of criteria is associated with a certain one of the set of POS subregions that corresponds to the object movement track.

In one exemplary embodiment, a POS system includes a terminal station apparatus and a bagging station apparatus with a bagging area. The terminal station apparatus includes a scanning platform with a scanning window and an optical scanning device operable to scan through the scanning window a visual object identifier code disposed on an object while transferred over the scanning window. The POS system is operationally coupled to an optical sensor device having an optical sensor with a field of view that includes a region about the POS system and operable to capture an image that includes the POS region. The POS region includes a set of POS subregions with a first POS subregion associated with a container having one or more objects, a second POS subregion associated with the scanning platform, a third POS subregion disposed in the second POS region and associated with the scanning window, and a fourth POS subregion associated with the bagging area. The POS system further includes a memory containing instructions executable by the processing circuitry, whereby the processing circuitry is configured to obtain data that represents a set of successive images of the POS region captured by the optical sensor device as a target object is moved in the POS region to enable a determination that the target object is transferred to the fourth POS subregion without being scanned based on a set of criteria associated with the set of POS subregions and an object movement track having a set of successive object locations of the target object as the target object is moved in the POS region. Further, each successive location is related to a certain one of the set of successive images of the POS region.

In another exemplary embodiment, the memory includes further instructions executable by the processing circuitry whereby the processing circuitry is configured to: detect activity in the first POS subregion based on the successive image data; determine that the activity in the first POS subregion corresponds to the target object disposed in the container based on the successive image data; or identify the target object as starting the object movement track in the first POS subregion.

In another exemplary embodiment, the memory includes further instructions executable by the processing circuitry whereby the processing circuitry is configured to identify at least one of the set of POS subregions that corresponds to object movement track.

In another exemplary embodiment, the memory includes further instructions executable by the processing circuitry whereby the processing circuitry is configured to: detect activity in the POS region based on the successive image; determine that the detected activity in the POS region corresponds to the target object in the second subregion based on the successive image; or determine that the target object can be in the bagging area without having to be scanned or weighed based on the successive image.

In another exemplary embodiment, the memory includes further instructions executable by the processing circuitry whereby the processing circuitry is configured to: determine, for the set of successive images, the set of successive object locations of the target object in the POS region based on the successive image data; or determine the object movement track based on the set of successive object locations.

In another exemplary embodiment, the memory includes further instructions executable by the processing circuitry whereby the processing circuitry is configured to determine that the target object is transferred to the fourth POS subregion without being scanned based on the set of criteria associated with the set of POS subregions and the object movement track.

In one exemplary embodiment, a POS system includes a terminal station apparatus, a bagging station apparatus, and an optical sensor device. The terminal station apparatus has a scanning platform that includes a scanning window and an optical scanner device operable to scan through the scanning window a visual object identifier code disposed on an object while transferred over the scanning window. The bagging station apparatus includes a bagging area. The optical sensor device includes an optical sensor having a field of view that includes a region about the POS system and operable to capture an image that includes the POS region. The POS region includes a set of POS subregions, with a first POS subregion being associated with a container having one or more objects, a second POS subregion being associated with the scanning platform, a third POS subregion disposed in the second POS region and associated with the scanning window, and a fourth POS subregion associated with the bagging area. The POS system further includes a processing circuitry and a memory containing instructions executable by the processing circuitry whereby the processing circuitry is operative to obtain data that represents a set of successive images of the POS region captured by the optical sensor device as a target object is moved in the POS region to enable a determination that the target object is transferred to the fourth POS subregion without being scanned based on a set of criteria associated with the set of POS subregions and an object movement track having a set of successive object locations of the target object as the target object is moved in the POS region. In addition, each successive location is related to a certain one of the set of successive image.

In one exemplary embodiment, a method performed by a POS system having a terminal station apparatus and a bagging station apparatus with a bagging area. Further, the terminal station apparatus includes a scanning platform having a scanning window and an optical scanner operable to scan through the scanning window a visual object identifier code disposed on an object while transferred over the scanning window. The POS system is operationally coupled to an optical sensor device having an optical sensor with a field of view that includes a region about the POS system and operable to capture an image that includes the POS region. The POS region includes a set of POS subregions with a POS subregion associated with a container configured to carry one or more objects, a POS subregion associated with the scanning window, and a POS subregion associated with the bagging area. The method includes identifying an interacted object from a set of detected objects in the POS region based on data that represents a set of successive images of the POS region captured by the optical sensor while the interacted object is interacted with in the POS region; extracting a set of interacted object track characteristics based on a set of detected object characteristics determined from a set of successive image segmentation masks that visually represents a segmentation of the set of detected objects and the set of POS subregions in the set of successive images; and applying an artificial intelligence model to the set of interacted object track characteristics to enable a determination that the interacted object is transferred to the POS subregion associated with the bagging area without being scanned.

In another exemplary embodiment, the method can further include applying the artificial intelligence model to the set of interacted object track characteristics to obtain an indication that the interacted object is transferred to the POS subregion associated with the bagging area without being scanned and a corresponding confidence level; and determining that the interacted object is transferred to the POS subregion associated with the bagging area without being scanned based on the indication and the corresponding confidence level.

In another exemplary embodiment, the method can further include detecting the set of detected objects displayed in the set of successive images based on the successive image data.

In another exemplary embodiment, the method can further include determining a set of successive image segmentation masks that visually represents the segmentation of the set of detected objects and the set of POS subregions displayed in the set of successive images based on the successive image data.

In another exemplary embodiment, the method can further include determining the set of detected object characteristics based on the set of successive image segmentation masks.

In another exemplary embodiment, the method can further include training the artificial intelligence model based on a set of predetermined interacted object track characteristics related to an object interacted with in the POS region from initial detection of that object in the POS region to a last detection of that object in the POS region that is proximate the POS subregion associated with the bagging area and without being scanned.

In another exemplary embodiment, the set of detected object characteristics includes a distance between at least two of the set of detected objects.

In another exemplary embodiment, the set of detected object characteristics includes a distance between at least one of the set of detected objects and at least one of the set of POS subregions.

In another exemplary embodiment, the set of interacted object track characteristics includes a distance between the interacted object and another object that interacts with the interacted object from initial detection of the interacted object in the POS region to a last detection of the interacted object in the POS region.

In another exemplary embodiment, the set of interacted object track characteristics includes a distance between the interacted object and the container from initial detection of the interacted object in the POS region to a last detection of the interacted object in the POS region.

In one exemplary embodiment, a POS system includes a terminal station apparatus and a bagging station apparatus with a bagging area. Further, the terminal station apparatus includes a scanning platform having a scanning window and an optical scanner operable to scan through the scanning window a visual object identifier code disposed on an object while transferred over the scanning window. The POS system is operationally coupled to an optical sensor device having an optical sensor with a field of view that includes a region about the POS system and operable to capture an image that includes the POS region. In addition, the POS region includes a set of POS subregions with a POS subregion associated with a container configured to carry one or more objects, a POS subregion associated with the scanning window, and a POS subregion associated with the bagging area. The POS system further includes processing circuitry and a memory, with the memory containing instructions executable by the processing circuitry whereby the processing circuitry is configured to identify an interacted object from a set of detected objects in the POS region based on data that represents a set of successive images of the POS region captured by the optical sensor while the interacted object is interacted with in the POS region; extract a set of interacted object track characteristics based on a set of detected object characteristics determined from a set of successive image segmentation masks that visually represents a segmentation of the set of detected objects and the set of POS subregions in the set of successive images; and apply an artificial intelligence model to the set of interacted object track characteristics to enable a determination that the interacted object is transferred to the POS subregion associated with the bagging area without being scanned.

In another exemplary embodiment, the memory includes further instructions executable by the processing circuitry whereby the processing circuitry is configured to apply the artificial intelligence model to the set of interacted object track characteristics to obtain an indication that the interacted object is transferred to the POS subregion associated with the bagging area without being scanned and a corresponding confidence level; and determine that the interacted object is transferred to the POS subregion associated with the bagging area without being scanned based on the indication and the corresponding confidence level.

In another exemplary embodiment, the memory includes further instructions executable by the processing circuitry whereby the processing circuitry is configured to detect the set of detected objects displayed in the set of successive images based on the successive image data.

In another exemplary embodiment, the memory includes further instructions executable by the processing circuitry whereby the processing circuitry is configured to determine a set of successive image segmentation masks that visually represents the segmentation of the set of detected objects and the set of POS subregions displayed in the set of successive images based on the successive image data.

In another exemplary embodiment, the memory includes further instructions executable by the processing circuitry whereby the processing circuitry is configured to determine the set of detected object characteristics based on the set of successive image segmentation masks.

In another exemplary embodiment, the memory includes further instructions executable by the processing circuitry whereby the processing circuitry is configured to train the artificial intelligence model based on a set of predetermined interacted object track characteristics related to an object interacted with in the POS region from initial detection of that object in the POS region to a last detection of that object in the POS region that is proximate the POS subregion associated with the bagging area and without being scanned.

In one exemplary embodiment, a POS system includes a terminal station apparatus having a scanning platform that includes a scanning window and an optical scanner device operable to scan through the scanning window a visual object identifier code disposed on an object while transferred over the scanning window; a bagging station apparatus having a bagging area; an optical sensor device having an optical sensor with a field of view that includes a region about the POS system and operable to capture an image that includes the POS region, with the POS region having a set of POS subregions including a POS subregion associated with a container, a POS subregion associated with the scanning window, and a POS subregion associated with the bagging area; and a processing circuitry and a memory containing instructions executable by the processing circuitry whereby the processing circuitry is operative to: identify an interacted object from a set of detected objects in the POS region based on data that represents a set of successive images of the POS region captured by the optical sensor while the interacted object is interacted with in the POS region; extract a set of interacted object track characteristics based on a set of detected object characteristics determined from a set of successive image segmentation masks that visually represents a segmentation of the set of detected objects and the set of POS subregions in the set of successive images; and apply an artificial intelligence model to the set of interacted object track characteristics to enable a determination that the interacted object is transferred to the POS subregion associated with the bagging area without being scanned.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a point of sale (POS) system having a terminal station apparatus and a bagging station apparatus with a bagging area, the terminal station apparatus includes a scanning platform having a scanning window and an optical scanner operable to scan through the scanning window a visual object identifier code disposed on an object while transferred over the scanning window, the POS system being operationally coupled to an optical sensor device having an optical sensor with a field of view that includes a region about the POS system and operable to capture an image that includes the POS region, the POS region includes a set of POS subregions with a POS subregion associated with a container configured to carry one or more objects, a POS subregion associated with the scanning window, and a POS subregion associated with the bagging area, identifying an interacted object from a set of detected objects that is interacted with in the POS region as displayed in the set of successive images based on the set of detected objects and successive image data that represents a set of successive images of the POS region captured by the optical sensor;

determining a set of successive image segmentation masks representing segmentation of the interacted object, the set of detected objects, and the set of POS subregions displayed in the set of successive images based on the successive image data;

determining a set of detected object characteristics based on the set of successive image segmentation masks, the set of detected object characteristics including a distance between at least one of the set of detected objects and at least one of the set of POS subregions and a distance between the interacted object and the container from initial detection of the interacted object in the POS region to a last detection of the interacted object in the POS region;

extracting a set of interacted object track characteristics that corresponds to the interaction with the interacted object in the POS region as displayed in the set of successive images based on the set of detected object characteristics determined from the set of successive image segmentation masks representing segmentation of the interacted object, the set of detected objects and the set of POS subregions displayed in the set of successive images;

applying an artificial intelligence model to the set of interacted object track characteristics to obtain an indication that the interacted object is transferred to the POS subregion associated with the bagging area without being scanned and a corresponding confidence level, the artificial intelligence model having been trained based on a set of predetermined interacted object track characteristics related to an object interacted with in the POS region from initial detection of that object in the POS region to a last detection of that object in the POS region that is proximate the POS subregion associated with the bagging area and without being scanned; and determining that the interacted object is transferred to the POS subregion associated with the bagging area without being scanned based on the indication and the corresponding confidence level.

2. The method of claim 1, wherein the set of detected object characteristics further includes a distance between at least two of the set of detected objects.

3. The method of claim 1, wherein the set of interacted object track characteristics further includes a distance between the interacted object and another object that interacts with the interacted object from initial detection of the interacted object in the POS region to a last detection of the interacted object in the POS region.

4. The method of claim 1, wherein the set of interacted object track characteristics includes an object movement track of the interacted object having a set of successive locations of the interacted object in the POS region, and wherein determining that the interacted object is transferred to the POS subregion associated with the bagging area without being scanned is further based on whether the POS subregion associated with the scanning window corresponds to the object movement track.

5. The method of claim 4, further comprising:

identifying at least one of the set of POS subregions that corresponds to the object movement track and determining a chronological order of the identified POS subregions, and wherein determining that the interacted object is transferred to the POS subregion associated with the bagging area without being scanned is further based on the chronological order of the identified POS subregions.

6. The method of claim 4, wherein determining that the interacted object is transferred to the POS subregion associated with the bagging area without being scanned is further based on a number of the set of POS subregions that correspond to the object movement track.

7. The method of claim 4, wherein determining that the interacted object is transferred to the POS subregion associated with the bagging area without being scanned is further based on a starting POS subregion or an ending POS subregion that corresponds to the object movement track.

8. The method of claim 4, further comprising:
determining a set of distances between the object movement track and the POS subregion associated with the bagging area, and wherein determining that the interacted object is transferred to the POS subregion associated with the bagging area without being scanned is further based on the set of distances.

9. The method of claim 7, wherein determining that the interacted object is transferred to the POS subregion associated with the bagging area without being scanned is further based on a time period between the starting POS subregion and the ending POS subregion that correspond to the object movement track.

10. The method of claim 8, wherein determining that the interacted object is transferred to the POS subregion associated with the bagging area without being scanned is further based on a maximum distance in the set of distances being less than a distance threshold.

11. A point of sale (POS) system, comprising:
with the POS system having a terminal station apparatus and a bagging station apparatus with a bagging area, the terminal station apparatus includes a scanning platform having a scanning window and an optical scanner operable to scan through the scanning window a visual object identifier code disposed on an object while transferred over the scanning window, the POS system being operationally coupled to an optical sensor device having an optical sensor with a field of view that includes a region about the POS system and operable to capture an image that includes the POS region, the POS region includes a set of POS subregions with a POS subregion associated with a container configured to carry one or more objects, a POS subregion associated with the scanning window, and a POS subregion associated with the bagging area; and
wherein the POS system further includes processing circuitry and a memory, with the memory containing instructions executable by the processing circuitry whereby the processing circuitry is configured to:
identify an interacted object from a set of detected objects that is interacted with in the POS region as displayed in a set of successive images based on the set of detected objects and successive image data that represents the set of successive images of the POS region captured by the optical sensor;
determine a set of successive image segmentation masks representing segmentation of the interacted object, the set of detected objects, and the set of POS subregions displayed in the set of successive images based on the successive image data;
determine a set of detected object characteristics based on the set of successive image segmentation masks, the set of detected object characteristics including a distance between at least one of the set of detected objects and at least one of the set of POS subregions and a distance between the interacted object and the container from initial detection of the interacted object in the POS region to a last detection of the interacted object in the POS region;
extract a set of interacted object track characteristics that corresponds to the interaction with the interacted object in the POS region as displayed in the set of successive images based on the set of detected object characteristics determined from the set of successive image segmentation masks representing segmentation of the interacted object, the set of detected objects and the set of POS subregions displayed in the set of successive images;
apply an artificial intelligence model to the set of interacted object track characteristics to obtain an indication that the interacted object is transferred to the POS subregion associated with the bagging area without being scanned and a corresponding confidence level, the artificial intelligence model having been trained based on a set of predetermined interacted object track characteristics related to an object interacted with in the POS region from initial detection of that object in the POS region to a last detection of that object in the POS region that is proximate the POS subregion associated with the bagging area and without being scanned; and
determine that the interacted object is transferred to the POS subregion associated with the bagging area without being scanned based on the indication and the corresponding confidence level.

12. The POS system of claim 11, wherein the set of detected object characteristics further includes a distance between at least two of the set of detected objects.

13. The POS system of claim 11, wherein the set of interacted object track characteristics further includes a distance between the interacted object and another object that interacts with the interacted object from initial detection of the interacted object in the POS region to a last detection of the interacted object in the POS region.

14. The POS system of claim 11, wherein the set of interacted object track characteristics includes an object movement track of the interacted object having a set of successive locations of the interacted object in the POS region; and
wherein the memory includes further instructions executable by the processing circuitry whereby the processing circuitry is configured to:
determine that the interacted object is transferred to the POS subregion associated with the bagging area without being scanned further based on whether the POS subregion associated with the scanning window corresponds to the object movement track.

15. The POS system of claim 14, wherein the memory includes further instructions executable by the processing circuitry whereby the processing circuitry is configured to:
identify at least one of the set of POS subregions that corresponds to the object movement track and determine a chronological order of the identified POS subregions, and wherein the processing circuitry is configured to determine that the interacted object is transferred to the POS subregion associated with the bagging area without being scanned further based on the chronological order of the identified POS subregions.

16. The POS system of claim 14, wherein the memory includes further instructions executable by the processing circuitry whereby the processing circuitry is configured to:
determine that the interacted object is transferred to the POS subregion associated with the bagging area without being scanned further based on a number of the set of POS subregions that correspond to the object movement track.

17. The POS system of claim 14, wherein the memory includes further instructions executable by the processing circuitry whereby the processing circuitry is configured to:

determine that the interacted object is transferred to the POS subregion associated with the bagging area without being scanned further based on a starting POS subregion or an ending POS subregion that corresponds to the object movement track.

18. The POS system of claim 14, wherein the memory includes further instructions executable by the processing circuitry whereby the processing circuitry is configured to:

determine a set of distances between the object movement track and the POS subregion associated with the bagging area; and determine that the interacted object is transferred to the POS subregion associated with the bagging area without being scanned further based on the set of distances.

19. The POS system of claim 11, wherein the set of interacted object track characteristics includes a distance between the interacted object and another object that interacts with the interacted object from initial detection of the interacted object in the POS region to a last detection of the interacted object in the POS region and a distance between the interacted object and the container from the initial detection to the last detection; and wherein the memory includes further instructions executable by the processing circuitry whereby the processing circuitry is configured to:

determine that the interacted object is transferred to the POS subregion associated with the bagging area without being scanned further based on a time period between a starting POS subregion and an ending POS subregion that correspond to an object movement track of the interacted object.

20. A point of sale (POS) system, comprising:

a terminal station apparatus having a scanning platform that includes a scanning window and an optical scanner device operable to scan through the scanning window a visual object identifier code disposed on an object while transferred over the scanning window;

a bagging station apparatus having a bagging area;

an optical sensor device having an optical sensor with a field of view that includes a region about the POS system and operable to capture an image that includes the POS region, with the POS region having a set of POS subregions including a POS subregion associated with a container, a POS subregion associated with the scanning window, and a POS subregion associated with the bagging area; and a processing circuitry and a memory containing instructions executable by the processing circuitry whereby the processing circuitry is operative to:

identify an interacted object from a set of detected objects that is interacted with in the POS region as displayed in a set of successive images based on the set of detected objects and successive image data that represents the set of successive images of the POS region captured by the optical sensor;

determine a set of successive image segmentation masks representing segmentation of the interacted object, the set of detected objects, and the set of POS subregions displayed in the set of successive images based on the successive image data;

determine a set of detected object characteristics based on the set of successive image segmentation masks, the set of detected object characteristics including a distance between at least one of the set of detected objects and at least one of the set of POS subregions and a distance between the interacted object and the container from initial detection of the interacted object in the POS region to a last detection of the interacted object in the POS region;

extract a set of interacted object track characteristics that corresponds to the interaction with the interacted object in the POS region as displayed in the set of successive images based on the set of detected object characteristics determined from the set of successive image segmentation masks representing segmentation of the interacted object, the set of detected objects and the set of POS subregions displayed in the set of successive images;

apply an artificial intelligence model to the set of interacted object track characteristics to obtain an indication that the interacted object is transferred to the POS subregion associated with the bagging area without being scanned and a corresponding confidence level, with the artificial intelligence model having been trained based on a set of predetermined interacted object track characteristics related to an object interacted with in the POS region from initial detection of that object in the POS region to a last detection of that object in the POS region that is proximate the POS subregion associated with the bagging area and without being scanned; and determine that the interacted object is transferred to the POS subregion associated with the bagging area without being scanned based on the indication and the corresponding confidence level.

* * * * *